Patented July 18, 1950

2,515,240

UNITED STATES PATENT OFFICE 2,515,240

NITROPHENYL KETONIC AMINO ALCOHOLS

Loren M. Long, Grosse Pointe Woods, Mich., assignor to Parke, Davis & Company, Detroit, Mich., a corporation of Michigan No Drawing. Application July 25, 1949,
Serial No. 106,731

7 Claims. (Cl. 260—570.5)

This application is a continuation-in-part of my copending applications Serial No. 45,976, filed August 24, 1948, now abandoned, and Serial No. 60,182, filed November 15, 1948, and the invention relates to nitrophenyl ketonic amino alcohols and their acid addition salts and to methods for obtaining these products. More particularly the invention relates to nitrophenyl ketonic amino alcohol compounds which have in their free base form the formula,

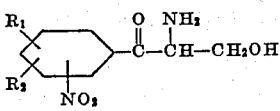

where $R_1$ and $R_2$ are the same or different and represent hydrogen, halogen, lower alkyl or lower alkoxy radicals.

Due to the rather unstable nature of the free base products the preferred compounds of the invention are the acid addition salts of the nitrophenyl ketonic amino alcohol compounds with organic or inorganic acids. Some examples of these acid addition salts are the hydrochloride, hydrobromide, hydroiodide, sulfate, sulfamate, benzoate, acetate, phosphate, phthalate, citrate, succinate, maleate, tartrate, propionate and the like.

In accordance with the invention the nitrophenyl ketonic amino alcohol compounds are obtained by hydrolysis of the corresponding nitrophenyl ketonic N-acylamido alcohol or acyloxy compound of formula,

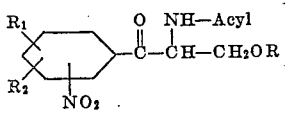

where $R_1$ and $R_2$ have the same significance as given above, Acyl is a carboxylic acyl radical and R is hydrogen or a carboxylic acyl radical. The preferred mode of hydrolysis is with an acid catalyst in which case the ketonic amino alcohol compound is obtained in the form of an acid addition salt. Of the many acidic catalysts which may be employed the mineral acids such as hydrochloric, hydrobromic, sulfuric, phosphoric and the like acids are preferred.

The products of the invention are particularly useful in the synthesis of organic compounds possessing antibiotic activity.

The invention is illustrated by the following examples.

Example 1

[a] 3 g. of p-nitro-α-acetamido-β-hydroxypropiophenone in 150 cc. of 5% hydrochloric acid is heated under reflux for about two to three hours. The reaction mixture is evaporated to dryness in vacuo to obtain the desired p-nitro-α-amino-β-hydroxypropiophenone hydrochloride of formula,

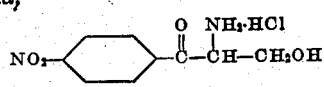

If desired, this white solid product, M. P. 182° C. after recrystallization, can be neutralized with a weakly alkaline substance to obtain the rather unstable free base. The free base oxidizes and rapidly turns red on exposure to air.

p-Nitro-α-amino-β-hydroxypropiophenone hydrochloride can also be obtained by substituting 3 g. of p-nitro-α-acetamido-β-acetoxypropiophenone for the free hydroxy starting material used above.

If 150 cc. of 5% hydrobromic acid or sulfuric acid is used in the above procedure one obtains the respective hydrobromide and sulfate salts of p-nitro-α-amino-β-hydroxypropiophenone.

[b] 50.4 g. of p-nitro-α-acetamido-β-hydroxypropiophenone in 500 cc. of 18% hydrochloric acid is heated on a steam bath for forty-five minutes and then the solution concentrated to dryness in vacuo after extraction of the solution with ethyl acetate. The solid residue which consists of p-nitro-α-amino-β-hydroxypropiophenone hydrochloride is ground with a little absolute ethanol, collected and washed with absolute ethanol; M. P. 182° C. dec. Recrystallization from hot absolute ethanol [1 g. per 50 cc.] raises the melting point to 182–3° C.

Example 2

5 g. of o-methyl-p-nitro-α-acetamido-β-hydroxypropiophenone in 150 cc. of 10% hydrobromic acid is heated under reflux for about two hours. The reaction mixture is evaporated to dryness in vacuo to obtain the desired white, crystalline hydrobromide salt of o-methyl-p-nitro-α-amino-β-hydroxypropiophenone. This product has the formula,

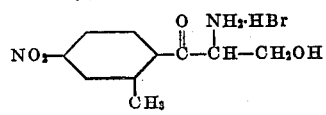

and can be purified by recrystallization from absolute ethanol. The hydrochloride salt is obtained by substituting hydrochloric acid for the hydrobromic acid used above. It has the formula,

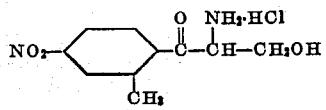

and is a white crystalline solid. The procedure used is as follows:

5 g. of o-methyl-p-nitro-α-acetamido-β-hydroxypropiophenone is heated under reflux with 150 cc. of 10% hydrochloric acid for two hours. The reaction mixture is evaporated to dryness in vacuo, the residual hydrochloride salt washed with absolute ethanol and collected. Purification by recrystallization from absolute ethanol yields the desired o-methyl-p-nitro-α-amino-β-hydroxypropiophenone hydrochloride as a white crystalline solid.

*Example 3*

5 g. of m-methoxy-p-nitro-α-p'-toluylamido-β-hydroxypropiophenone is heated under reflux for three hours with 150 cc. of 10% hydrochloric acid. The reaction mixture is cooled, exhaustively extracted with ether to remove the p-methyl benzoic acid and the aqueous phase evaporated to dryness in vacuo. The crystalline residue obtained upon evaporation of the aqueous phase is m-methoxy-p-nitro-α-amino-β-hydroxypropiophenone hydrochloride of formula,

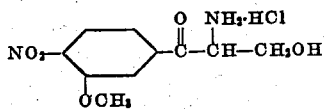

If desired, this white crystalline salt may be purified by recrystallization from hot absolute ethanol.

The acetate salt of this product can be obtained by dissolving the solid hydrochloride in dilute acetic acid and adding at least one equivalent of sodium acetate to the solution.

*Example 4*

6 g. of 2-nitro-4,5-dimethyl-α-phenacetamido-β-hydroxypropiophenone is heated under reflux with 150 cc. of 10% sulfuric acid for two hours. The reaction mixture is cooled, the phenylacetic acid removed by extraction with ether and the aqueous phase evaporated to dryness in vacuo to obtain the white, crystalline sulfate salt of 2-nitro-4,5-dimethyl-α-amino-β-hydroxypropiophenone of formula,

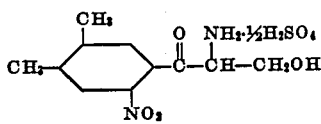

*Example 5*

3 g. of 3-nitro-5-chloro-α-[α'-chloropropionamido]-β-hydroxypropiophenone is heated for two hours under reflux with 100 cc. of 10% hydrochloric acid. The reaction mixture is evaporated to dryness in vacuo to obtain the desired 3-nitro-5-chloro-α-amino-β-hydroxypropiophenone hydrochloride of formula,

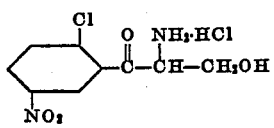

By using the corresponding 5-bromo compound as the starting material one obtains 3-nitro-5-bromo-α-amino-β-hydroxypropiophenone hydrochloride as a white crystalline solid.

*Example 6*

4 g. of 2-chloro-4-nitro-6-methyl-α-acetamido-β-hydroxypropiophenone is heated under reflux with 100 cc. of 10% hydrochloric acid for two hours. The reaction mixture is evaporated to dryness in vacuo to obtain the desired 2-chloro-4-nitro-6-methyl-α-amino-β-hydroxypropiophenone hydrochloride of formula,

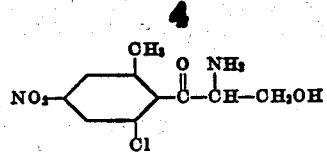

The nitrophenyl ketonic N-acylamido alcohol and acyloxy compounds used as starting materials in the practice of the invention may be prepared as described in my copending applications Serial No. 45,976, filed August 24, 1948, and Serial No. 60,182, filed November 15, 1948, now abandoned. In said applications I have described and claimed a method for preparing the nitrophenyl ketonic N-acylamido alcohol compounds by the reaction of formaldehyde with an ω-N-acylamidonitrophenylacetophenone in the presence of an alkaline catalyst. The following specific example showing the preparation of p-nitro-α-acetamido-β-hydroxypropiophenone is illustrative of the general process used to prepare these starting materials.

11.1 g. of p-nitro-ω-acetamidoacetophenone is mixed with 55 cc. of methanol and 17 cc. of 36–38% aqueous formaldehyde. 0.4 g. of sodium bicarbonate is added and the mixture stirred at 35° C. for about one hour and a half during which time the solid product separates. The mixture is cooled and stirred for one-half hour, the solid product collected, washed with water and dried at 60° C. The product thus obtained is p-nitro-α-acetamido-β-hydroxypropiophenone; M. P. 166–7° C., which has the formula,

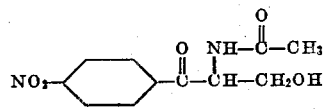

The β-acyloxy starting materials are prepared in accordance with the acylation procedure disclosed in my aforementioned applications. The preparation of p-nitro-α-acetamido-β-acetoxypropiophenone is illustrative of the general method.

8 g. of p-nitro-α-acetamido-β-hydroxypropiophenone is heated at about 75° C. for one-half hour with 20 cc. of acetic anhydride containing a small amount of concentrated sulfuric acid. The reaction mixture is evaporated to dryness in vacuo, the residue washed with ice water and purified by recrystallization from methanol or ethanol. The product thus obtained is p-nitro-α-acetamido-β-acetoxypropiophenone which has the formula,

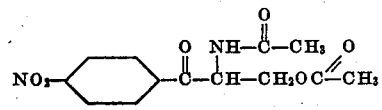

What I claim is:

1. A compound of the class consisting of a free base and its acid addition salts, said free base having the formula,

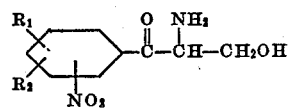

where $R_1$ and $R_2$ are members of the class consisting of hydrogen, halogen, lower alkyl and lower alkoxy radicals.

2. An acid addition salt of p-nitro-α-amino-β-hydroxypropiophenone.

3. p-Nitro-α-amino-β-hydroxypropiophenone hydrochloride.

4. An acid addition salt of o-methyl-p-nitro-α-amino-β-hydroxypropiophenone.

5. o-Methyl-p-nitro-α-amino-β-hydroxypropiophenone hydrochloride.

6. An acid addition salt of m-methoxy-p-nitro-α-amino-β-hydroxypropiophenone.

7. m-Methoxy-p-nitro-α-amino-β-hydroxypropiophenone hydrochloride.

LOREN M. LONG.

No references cited.